Oct. 25, 1949.  G. D. WILLET  2,485,853
DIRIGIBLE TRAILER
Filed Aug. 3, 1946  4 Sheets-Sheet 1
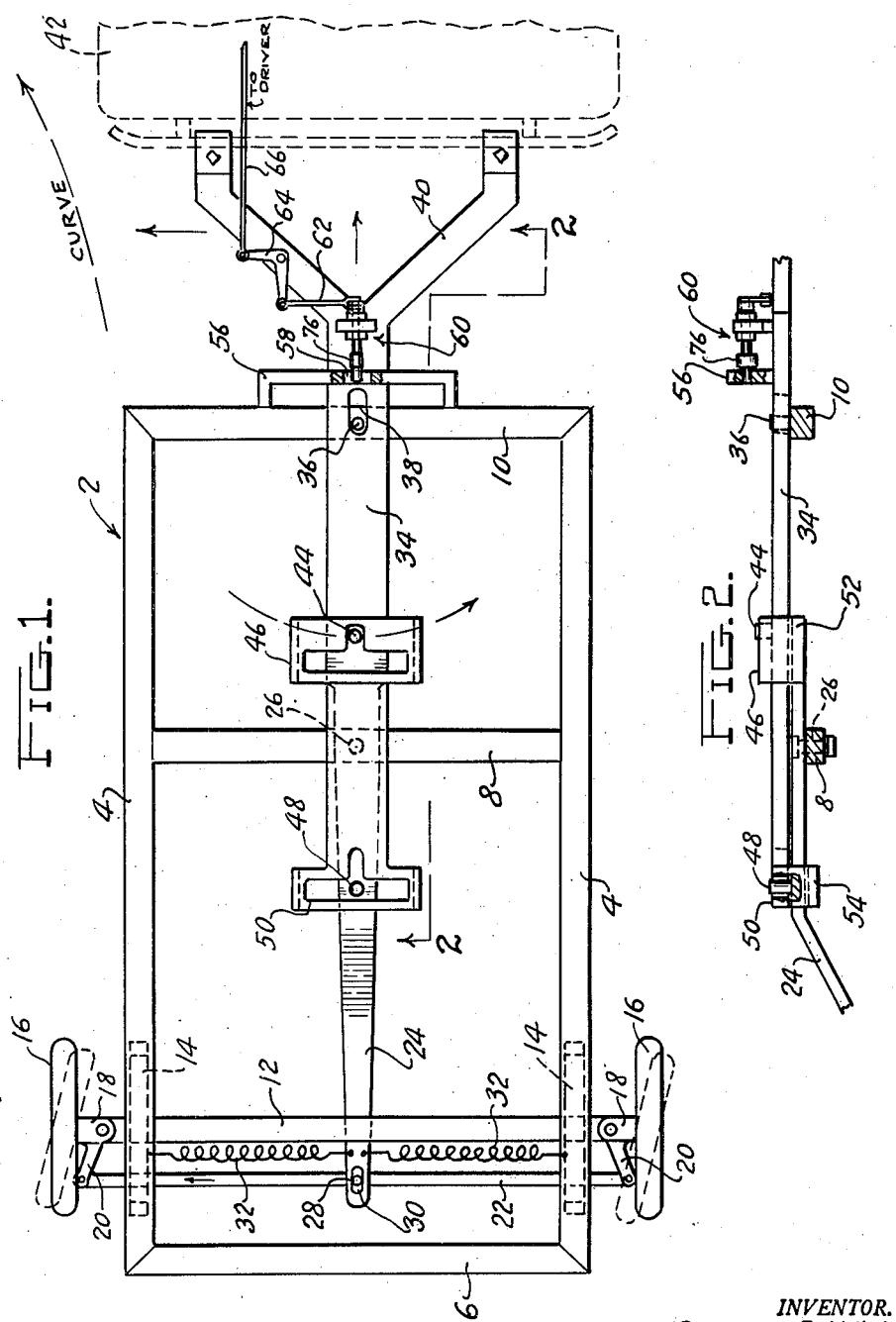
INVENTOR.
George D. Willet
BY
Hauke & Hardesty
ATTORNEYS

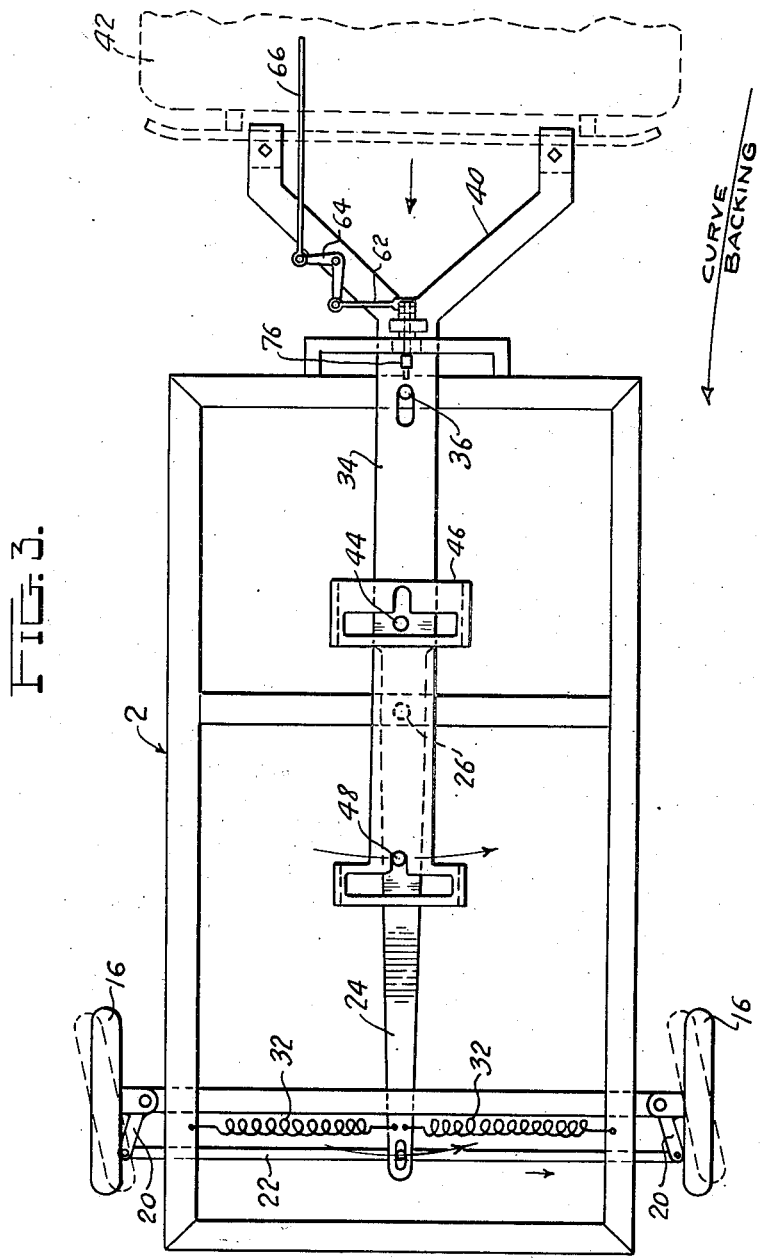

Oct. 25, 1949.  G. D. WILLET  2,485,853
DIRIGIBLE TRAILER
Filed Aug. 3, 1946  4 Sheets-Sheet 3
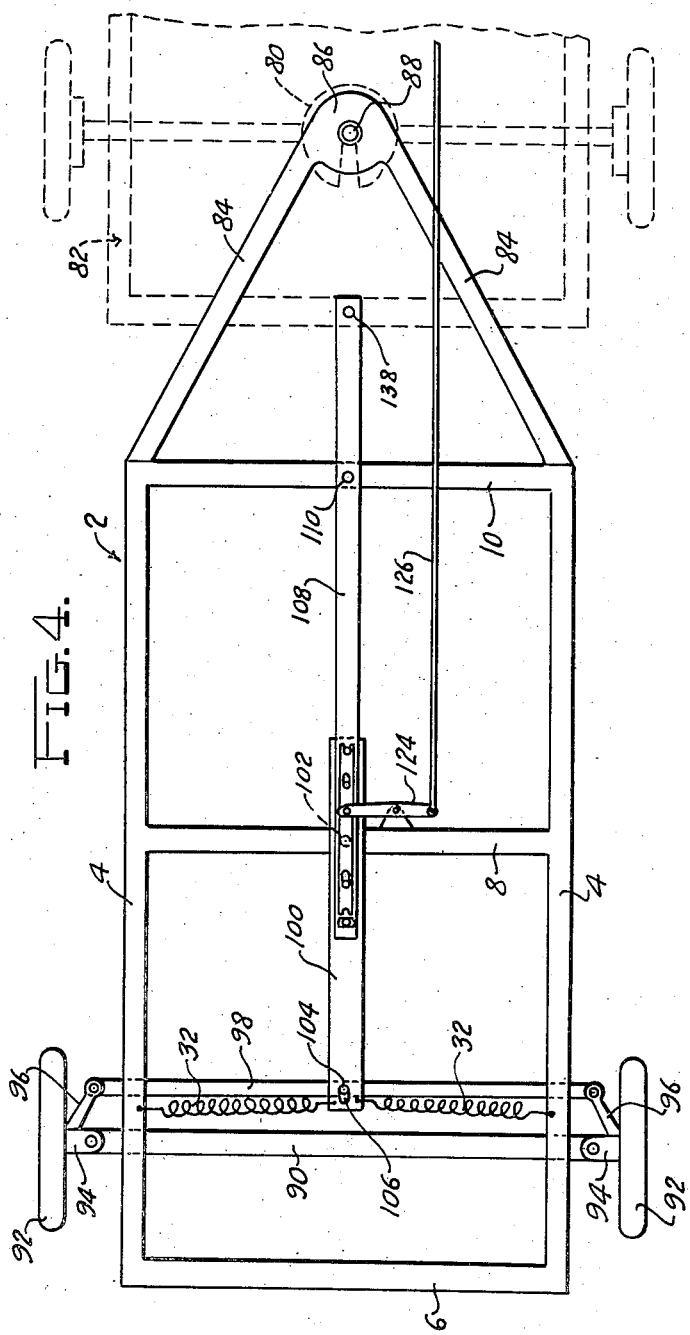
INVENTOR.
George D. Willet
BY Hauke & Hardesty
ATTORNEYS Oct. 25, 1949.    G. D. WILLET    2,485,853
DIRIGIBLE TRAILER
Filed Aug. 3, 1946    4 Sheets-Sheet 4
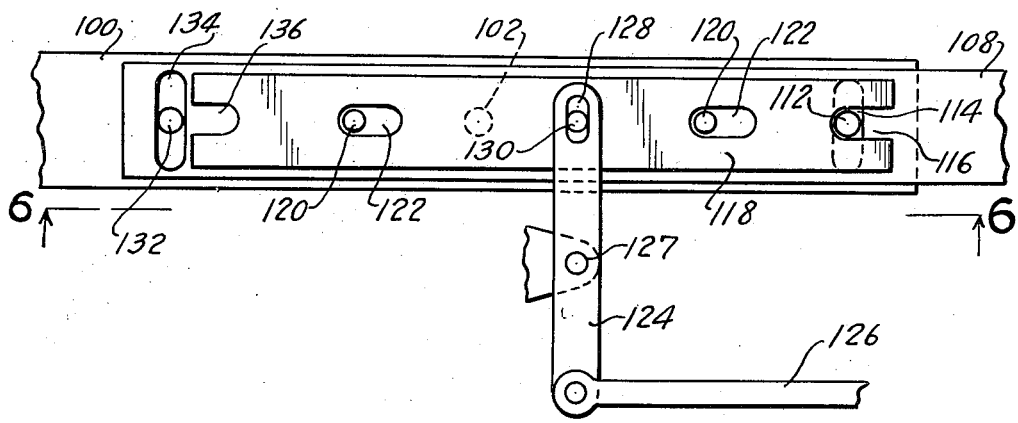
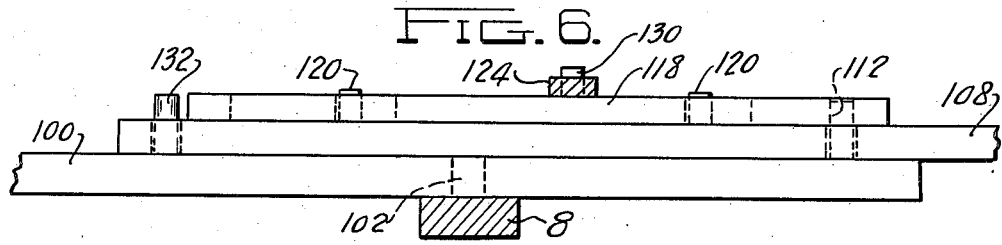
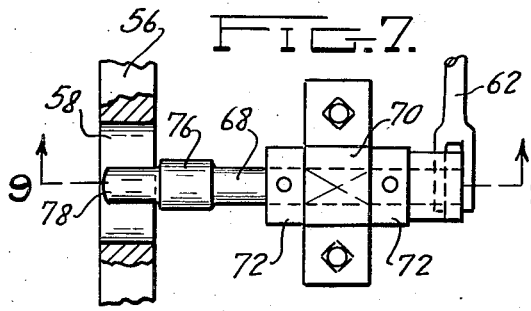
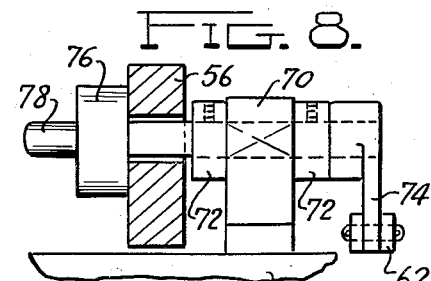
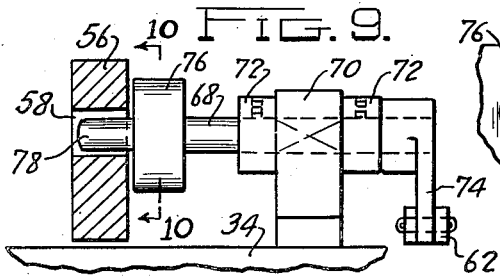
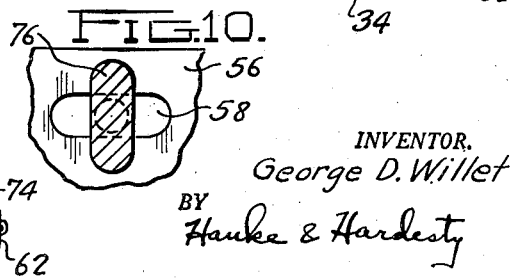
INVENTOR.
George D. Willet
BY Hauke & Hardesty
ATTORNEYS Patented Oct. 25, 1949

2,485,853

UNITED STATES PATENT OFFICE 2,485,853

DIRIGIBLE TRAILER

George D. Willet, Lincoln Park, Mich.

Application August 3, 1946, Serial No. 688,262

11 Claims. (Cl. 280—33.55)

This invention relates to dirigible trailers.

The drivers of tractor-trailer trains have long had trouble with failure of trailers to "track" properly. The greatest difficulty arises when attempting to back up with a tractor-trailer combination. Unless this maneuver is done by an expert of long-standing experience, the train is almost certain to "jack-knife." The difficulty is, of course, not limited to jack-knifing while backing up, but extends also to improper tracking while moving in the forward direction.

It is the object of this invention to provide a trailer which may be steered in either direction of operation, and which is steered automatically by the relative motion of the towing vehicle and the trailer. This is accomplished by wheels on the trailer which are steered by means of linkage operated by the means coupling the tractor and trailer together.

In the drawings:

Fig. 1 is a plan view of the chassis of a trailer made according to the invention, with the parts shown in position for forward motion.

Fig. 2 is a view in section substantially on line 2—2 of Figure 1.

Fig. 3 is a plan view of the trailer shown in Figure 1 but with the parts shown in their relative positions for backing up the tractor-trailer train.

Fig. 4 is a plan view of the chassis of another embodiment of the invention.

Fig. 5 is a detail view of the lock member shown in Figure 4.

Fig. 6 is a view in section substantially on line 6—6 of Figure 5.

Fig. 7 is a detail plan view of the lock mechanism shown in Figures 1, 2 and 3, with the parts shown in their relative position for forward motion.

Fig. 8 is a side elevation view showing in detail the lock mechanism of the trailer of Figures 1, 2 and 3, with the parts occupying their relative positions for backing up the train.

Fig. 9 is a view in section on line 9—9 of Figure 7 and

Fig. 10 is a view in section on line 10—10 of Figure 9.

Referring now in detail to the drawings, a trailer made according to the invention is shown as having a frame 2 which consists of side rails 4 and cross members 6, 8 and 10. An axle 12 supports the side rails 4 through springs 14. Wheels 16 are dirigibly mounted on the axle by means of steering knuckles 18. Steering arms 20 are joined by a suitable actuating member such as tie rod 22 which dirigibly moves the wheels in unison. Steering arms 20 are shown as being pointed outward, instead of being parallel. The purpose of this arrangement of the steering arms is to permit the inside wheel on a curve to be turned further than the outside wheel, in order that the inside wheel may describe a smaller circle without scuffing the tires.

A member 24, which for convenience may be called a reach, is pivotally mounted at 26 on cross member 8 and engages tie rod 22 by means of a pin 28 on the tie rod cooperating with a slot 30 in the end of the reach. A steering damper in the form of springs 32 is preferably applied near the end of the reach. Springs 32 are joined at one end to the reach and at the other end to the side members 4 or to any other suitable portion of the frame, and preferably operate under tension.

A second member 34, which for convenience may be called a tongue, is pivotally mounted on cross member 10 at 36. A slot 38 in the tongue permits limited reciprocable movement of tongue 34 relatively to the frame 2. Tongue 34 carries a bifurcated hitch member 40 at its forward end which is adapted to be secured to a tractor or towing vehicle 42.

As can be seen from Figures 1 and 2, the reach 24 and tongue 34 overlap to some extent. A projection such as pin 44 is provided on one of the pivotally mounted members (on tongue 34 in the embodiment shown) in front of one of the pivot axes (pivot 26 in the embodiment shown) for cooperation with a T-shaped recess in a plate 46 which is integral with the other pivotally mounted member (reach 24 in the embodiment shown). A second projection in the form of pin 48 is shown on one of the pivotally mounted members (reach 24 in the embodiment shown) behind the pivot 26. Pin 48 cooperates with a T-shaped slot in a plate 50 which is integral with the other pivotally mounted member (tongue 34 in the embodiment shown). As is best seen in Figure 2 each of plates 46 and 50 forms a closed loop 52 and 54 respectively. Loop 52 surrounds the tongue 34 and loop 54 surrounds the reach 24. At or near the forward end of frame 2 there is provided lock means which consists of a member 56 secured to the frame 2 and having an elongated recess 58. The long axis of recess 58 is shown in Figure 1, and the short axis thereof is shown in Figure 2. Cooperating with the recess 58 is a lock member 60 which is connected to be actuated from the driver's seat through rod 62, bell crank 64, and rod 66.

The details of lock member 60 are shown in Figures 7 and 10 inclusive. As can be seen from those figures the lock member consists of a spindle 68 rotatable in a saddle type bearing 70 and held against longitudinal displacement relatively to the bearing 70 by means of collars 72. A crank arm 74 is provided for rotation of spindle 68. Crank arm 74 is connected to be actuated by rod 62, referred to above. Spindle 68 carries an elongated member 76 which has the same general shape as the elongated recess 58. See especially Figure 10. To the rear of elongated member 76 there is mounted a guide 78 which projects into the recess 58 for normal forward movement of the tractor-trailer train.

Figure 4 shows another embodiment of the invention. In this figure the invention is shown as applied to a semi-trailer. As before, frame 2 is shown having side rails 4 and cross members 6, 8 and 10. In this embodiment, however, frame 2 is carried at its forward end on a fifth wheel 80 of a tractor 82, by means of the converging members 84 carrying a bearing plate 86 in which is mounted a pin 88 for cooperation with the fifth wheel in a manner which will be well understood by those skilled in the art.

Axle 90 carries wheels 92 which are dirigibly mounted on knuckles 94 and are connected to be turned on their vertical axes by means of steering arms 96. Steering arms 96 are connected to be moved in unison by an actuator such as tie rod 98, which is disposed ahead of the axle 90. With tie rod 98 ahead of the axle the ends of steering arms 96 point inward in order to give the inside wheel a sharper turning angle so that it may describe an arc having a smaller radius than the arc described by the outside wheel. A member 100, which may be called a reach for convenience, is mounted to pivot about the axis of a pin 102 and is connected to actuate the tie rod 98 by means of pin 104 on the tie rod cooperating with recess 106 in the end of the reach. As before, damper springs 32 may be provided to stabilize the reach.

A second member 108, which may for convenience be called a tongue, is mounted to pivot about the axis of a pin 110 in cross member 10. As is best seen in Figure 6 the tongue 108 and the reach 100 overlap. Ahead of one of the pivot axes (that of pin 102 in the embodiment shown) there is mounted a projection such as pin 112 in one of the pivotally mounted members (reach 100 in the embodiment shown), which extends through a transverse recess 114 in the other pivotally mounted member (tongue 108 in the embodiment shown). The upper end of pin 112 is positioned to cooperate with the longitudinal recess 116 in a lock plate 118. Plate 118 is mounted for limited reciprocation relatively to tongue 108 by means of pins 120 and elongated recesses 122. Reciprocation of the plate 118 is effected by linkage comprising actuating member 124 and rod 126. Rod 126 is connected to be manipulated from the driver's seat. Actuating member 124 pivots about a pin 127 and is recessed as at 128 to cooperate with a pin 130.

A second projection such as pin 132 is provided back of the pivot axis (the axis of pin 102) on one of the pivotally mounted members (in the embodiment shown, the reach 100) and extends through a transverse recess 134 in the other pivotally mounted member (tongue 108 in the embodiment shown). Cooperable with the upper end of pin 132 is a longitudinal recess 136 in lock plate 118.

Tongue 108 is connected at its forward end 138 to some portion of the tractor or towing vehicle which is to the rear of the fifth wheel.

*Operation*

In the operation of the embodiment shown in Figures 1 to 3, consider first Figure 1 in which the trailer is shown for normal forward operation. In this figure pin 48 is free to move in the transverse portion of the T-shaped slot and consequently does not engage tongue 34. However, pin 44 on tongue 34 is in the longitudinal portion of the T-shaped recess in plate 46. With the tractor wheels turned to follow a left hand curve, tongue 34 will pivot counterclockwise slightly about pin 36. The engagement between reach 24 and tongue 34 at pin 44 causes reach 24 to pivot clockwise about pin 26, effecting steering movement of wheels 16 in a direction to cause the trailer to follow the tractor around the curve.

Even if the train is proceeding forward down hill, the trailer cannot "run up" on the tractor to disengage pin 44 and engage pin 48 because the trailer and tractor are maintained in their relative positions as shown in Figure 1 by the lock mechanism 60. Elongated member 76 abuts against member 56 to maintain the positions shown.

When it is desired to back up with the train, member 76 is rotated through 90° by means of the linkage shown, whereupon, with the trailer wheel brakes set, the tractor is backed up permitting elongated member 76 to pass through the elongated recess 58, at the same time that pin 48 engages the longitudinal part of the T-shaped recess and pin 44 disengages the longitudinal portion of its cooperating T-shaped recess. Elongated member 76 of the lock mechanism is again rotated through 90° to hold the parts in the position shown in Figure 3. If now the towing vehicle wheels are turned to the right, tongue 34 is pivoted counterclockwise about its pivot 36 and through the pin 48 also pivots reach 24 counterclockwise about its pivot 26, turning the trailer wheels in the proper direction.

For normal forward operation of the semi-trailer embodiment shown in Figure 4, the lock plate occupies the position shown in this figure. If the tractor is steered to the right, tongue 108 is pivoted counterclockwise about its pin 110 pivoting the reach 100 clockwise about its pin 102. For a better understanding of this operation see Figure 5, which shows the parts in their forward running position. To back up with the train of Figure 4, lock plate 118 is shifted to disengage pin 112 and engage pin 132. In that event, turning the tractor wheels to the right rotates tongue 108 clockwise. With the plate shifted, reach 100 also pivots clockwise about its pin 102 and the wheels 92 are turned in the proper direction.

It will, of course, be understood that the selector and lock plate 118 shown in the embodiment of Figure 4 may be used in the trailer of Figure 1.

I claim:

1. A dirigible trailer comprising a frame mounted on a pair of dirigible wheels, an actuator for the wheels disposed entirely on one side of the steering axes of the wheels, a member operably engaging the actuator and mounted to pivot about a given axis on the frame, a second member mounted to pivot about a given axis on the frame and in position to engage the first member, and means to selectively engage the two members on either side of the aforesaid pivot axis of said first named member, 2. The invention of claim 1, in which the means includes a projection on one of the members positioned to cooperate with a recess in the other member.

3. The invention of claim 1, in which the two members are relatively reciprocable, and selective engagement is accomplished by relative reciprocation.

4. The invention of claim 1, in which the last-named means includes a projection on one of the pivotally mounted members, and a recessed movably mounted selector on the other pivotally mounted member.

5. A dirigible trailer comprising a pair of dirigible wheels, an actuator for the wheels disposed entirely on one side of the steering axes of the wheels, a member operably engaging the actuator and mounted to pivot about a given axis, a second member mounted to pivot about a given axis in position to engage the first member, a projection on one of the pivotally mounted members and mounted forward of one of the pivot axes, a second projection on one of the pivotally mounted members and mounted to the rear of said pivot axis, and means to select one of the projections to effect engagement of the two pivotally mounted members.

6. The invention of claim 5, in which the last-named means includes a selector which is recessed and movable to cooperate with one of the projections to effect engagement of the two pivotally mounted members at the selected projection.

7. A dirigible trailer comprising a pair of dirigible wheels, a member connected to move the wheels in unison and mounted to pivot about a given axis, a second member mounted to pivot about a given axis in position to engage the first member, a projection on one of the pivotally mounted members, a recess on the other pivotally mounted member cooperable with the projection, a second projection on one of the pivotally mounted members, and a second recess on the other pivotally mounted member cooperable with the second projection when the first-named projection and its associated recess are disengaged.

8. The invention of claim 7, in which a projection and its cooperating recess are engaged by movement of the trailer relatively to its tractor.

9. The invention of claim 7, in which a projection and its cooperating recess are engaged by movement of the trailer relatively to its tractor, and means to lock the members in the selected engagement.

10. In a dirigible trailer of a tractor-trailer train, a pair of dirigibly mounted wheels, a member mounted to pivot about a given axis and connected to move the wheels in unison, a second member mounted to pivot about a given axis in a position to engage the first member, a projection on one of the pivotally mounted members and mounted forward of one of the pivot axes, a second projection on one of the pivotally mounted members and mounted to the rear of said pivot axis, and means to select one of the projections to effect engagement of the two pivotally mounted members.

11. The invention of claim 10, in which the last-named means includes a selector which is recessed and movable to cooperate with one of the projections to effect engagement of the two pivotally mounted members at the selected projection.

GEORGE D. WILLET.

REFERENCES CITED

The following references are of record in the file of this patent:

UNITED STATES PATENTS

| Number | Name | Date |
|---|---|---|
| 1,174,018 | Mapson | Feb. 29, 1916 |
| 1,245,054 | Spencer | Oct. 30, 1917 |
| 2,247,201 | Yoder | Nov. 20, 1917 |